United States Patent [19]

Wykhuis et al.

[11] Patent Number: 4,744,582
[45] Date of Patent: May 17, 1988

[54] IMPLEMENT HITCH LINKAGE FOR FRONT MOUNT MOWERS

[75] Inventors: Lloyd A. Wykhuis; Michael J. O'Neill, both of Mayville; Ronald K. Leonard, Horicon, all of Wis.

[73] Assignee: Deere & Company, Moline, Ill.

[21] Appl. No.: 930,948

[22] Filed: Nov. 10, 1986

Related U.S. Application Data

[63] Continuation of Ser. No. 767,947, Sep. 16, 1985, abandoned.

[51] Int. Cl.⁴ .............................................. B60D 3/00
[52] U.S. Cl. ................... 280/460 A; 172/244; 172/445; 280/475; 280/490 A
[58] Field of Search ........... 280/405 R, 405 B, 411 A, 280/429, 431, 446 A, 456 A, 460 A, 475, 476 R, 490 R, 490 A; 172/240, 244, 445, 680

[56] References Cited

U.S. PATENT DOCUMENTS

| | | | |
|---|---|---|---|
| 2,446,321 | 8/1948 | Bartholomew | 280/475 |
| 3,762,480 | 10/1973 | Hofer | 172/445 X |
| 4,193,458 | 3/1980 | Meinert et al. | 172/445 X |
| 4,315,547 | 2/1982 | Rau et al. | 172/240 X |
| 4,371,039 | 2/1983 | Schaaf et al. | 172/244 |
| 4,440,415 | 4/1984 | Wykhuis et al. | 172/680 X |
| 4,563,019 | 1/1986 | Kuhn et al. | 280/490 A X |

Primary Examiner—John J. Love
Assistant Examiner—Charles R. Watts

[57] ABSTRACT

A hitch linkage for hitching an implement to a front mount riding mower including a plurality of hitch arms detachably mounted to the lift arms of the riding mower. A cross-link is pivotally mounted between the hitch arms. The support struts of a support wheel are fixably mounted to the cross-link. A cylinder selectively pivots the cross-link to raise or lower the support wheel. When the support wheel is lowered into ground engaging position, the support wheel is leading to the drive wheels of the riding mower during implement transport.

11 Claims, 3 Drawing Sheets

IMPLEMENT HITCH LINKAGE FOR FRONT MOUNT MOWERS

This application is a continuation of application Ser. No. 767,947 filed Sept. 16, 1985 now abandoned.

BACKGROUND OF THE INVENTION

The invention relates to implements hitchable to a tractor, more particularly, to means of hitching an implement to a front mount riding mower.

The front mount riding mower is a low center of gravity vehicle having front wheel drive and rear wheel steering. Because of the riding mower's low center of gravity, short wheelbase and compact turning radius, the riding mower offers the user superior maneuverability during ground care operations. To facilitate the attachment of ground care implements, hitch arms are pivotally mounted forwardly on the riding mower for the attachment of implements, such as, a mower deck or snow thrower. In order to increase the work capability of the riding mower, it would be advantageous if larger implements could be attached to the mower. However, because of the increased weight associated with the larger implement and the cantilevered manner in which the implement is supported during transport, the riding mower becomes unstable haivng a propensity to pivot about the front drive wheels during implement transport. In order to stabilize the riding mower, it is known to attach weights to the rear of the vehicle. However, weights decrease the power output available to the implement during ground care operation.

SUMMARY OF THE INVENTION

It is an objective of the present invention to present an implement hitch linkage for attaching an implement to a front mount riding mower which linkage includes means of stabilizing the vehicle during implement transport.

The hitch linkage includes first and second hitch plates detachably mounted to an implement, such as a snow thrower. A hitch tube is fixably mounted to each hitch plate. A cross-link is pivotally mounted at its ends to the hitch tubes. An implement support wheel is mounted approximately midway along the cross-link. In order to raise and lower the implement support wheel relative of the implement, a hydraulic cylinder is pivotally mounted to one of the hitch plate to the cross-link. The other ends of the hitch tubes are mounted to respective vehicle lift arms.

Other objects and advantages of the invention will be apparent from the following description, accompanying drawings and the appended claims.

DETAILED DESCRIPTION OF THE PRESENT INVENTION

Figure 1:
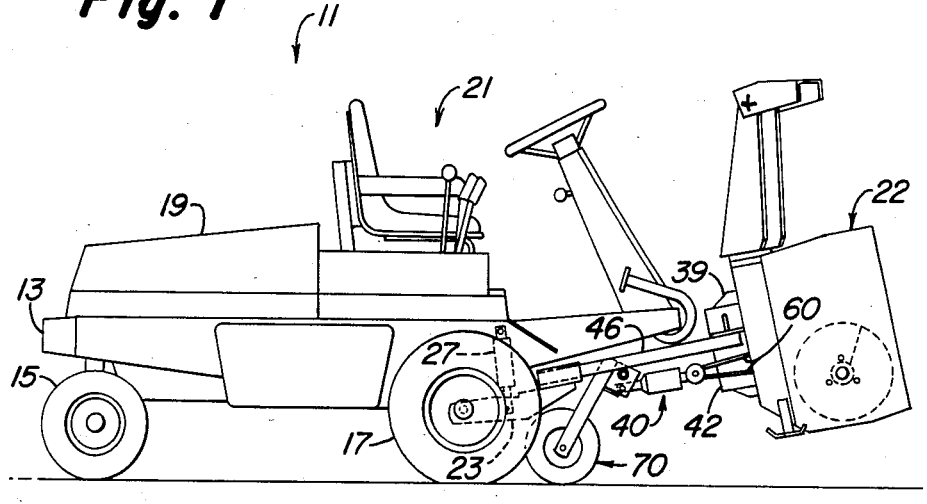
FIG. 1 is a side elevated view of a hitch linkage in accordance with the present invention hitching a snow thrower to a front mount riding mower.
Figure 3:
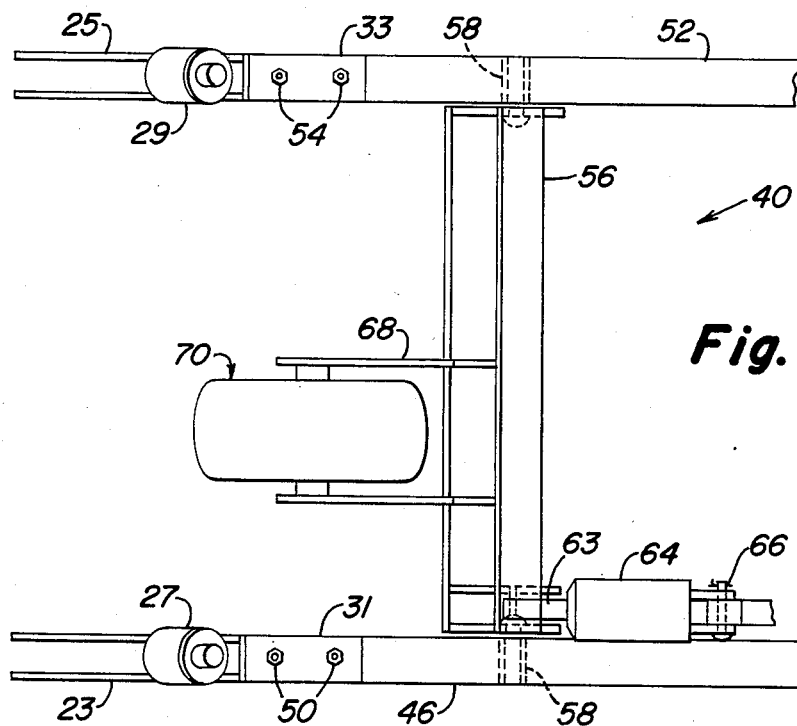
FIG. 3 is a top view of the hitch linkage.

Referring to FIG. 1, a front mount riding mower, generally indicated as 11, includes a frame 13 supported rearwardly by steering wheel 15 and forwardly by drive wheel 17 in a conventional manner. The vehicle's engine (not shown) and engine enclosure 19 are mounted on a rear portion of the frame 13 by any conventional means. An operator's station 21 is mounted to the frame forward of the engine enclosure 19. A snowblower 22 is hitched to the riding mower 11 in a manner described subsequently.

Referring to FIG.'s 1, 2 and 3, to facilitate the attachment of an implement, such as a snow thrower or mower deck, to the riding mower 11, it is known to equip the riding mower with lift arms 23 and 25 pivotally mounted in a transverse spaced apart relationship to riding mower frame 13 or other suitable riding mower component in a conventional manner. Lift cylinders 27 and 29 are pivotally mounted by any conventional means at one end to a respective lift arms 23 and 25. The other end of each of cylinders 27 and 29 is pivotally mounted by any conventional means to the frame 13 or other suitable riding mower component. The cylinders 27 and 29 are oriented relative to the respective lift arms 23 and 25 so as to raise or lower the lift arms 23 and 25 upon selective actuation. Hitch tubes 31 or 33 are fixably mounted at one end of the respective lift arm 23 or 25 by any conventional means such as welding.

A conventional snow thrower 22 includes a rear mounting plate 39. The hitch linkage 40 includes hitch plates 42 fixably mounted by any conventional means, such as by nut and bolt arrangements 44, to the mounting plate 39. A first hitch arm 46 is fixably mounted at one end by any conventional means to one of the hitch plates 42 by any conventional means such as by nut and bolt arrangements 48. The other end of hitch arm 46 is slidably received and detachably mounted in the mounting tube 31 by any conventional means such as by conventional nut and bolt arrangements 50. In like manner, a second hitch arm 52 is fixably mounted at one end to the other hitch plate 42 and at its other end is slidably received and detachably mounted in mounting tube 33 by any conventional means such as by conventional nut and bolt arrangements 54. A cross-link 56 is pivotally mounted at its ends to the hitch arms by any conventional means such as by a conventional hinge pin and boss arrangement 58.

One of the hitch plates 42 has fixably mounted thereto by any conventional means such as by welding, elongated tabs 60. Fixably mounted by any conventional means such as welding to the free end of elongated tabs 60 is a boss 62. A hydraulic cylinder 64 is pivotally mounted at one end to the boss 62 by any conventional means such as by pin 66. The rod 63 of the cylinder 64 is pivotally mounted to cross-link 56 at a point in space relationship to the pivot axis of the cross-link hinge pin and boss arrangements 58. The spaced relationship between the hinge pin and boss arrangements 58 and the cylinder arm 63 mounting location to cross-link 56 is such to cause the cross-link to pivot in response to displacement of cylinder arm 63. Fixably mounted to the cross-link 56 approximately midway therealong by any conventional means are the struts 68 of a conventional support wheel 70.

Figure 2:
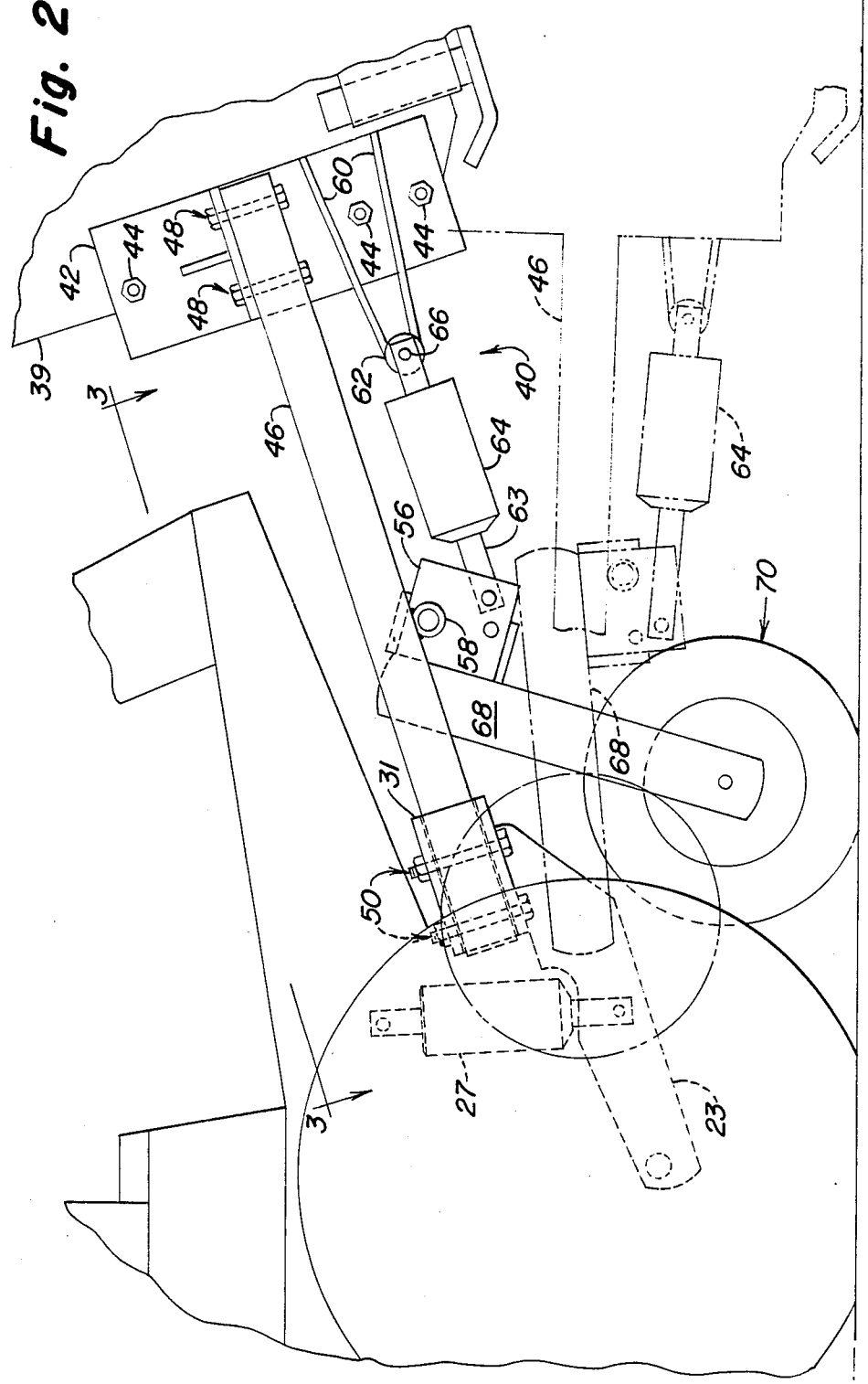
FIG. 2 is a side elevated view of the hitch linkage.
Figure 4:
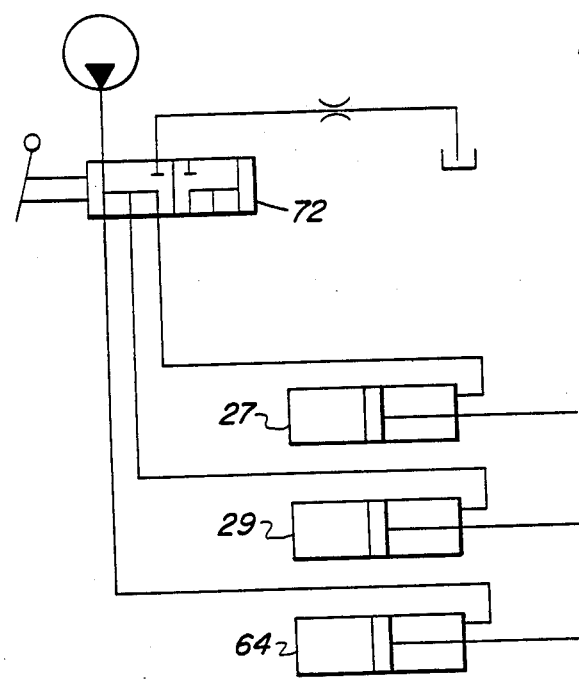
FIG. 4 is a schematic of hydraulic circuit for activating the hitch linkage cylinder and riding mower lift cylinders.

Referring more particularly to FIG.'s 2, 3 and 4, placing control valve 72 in a first position causes the cylinders 27 and 29 to lower the lift arms 23 and 25 thereby lowering the snow blower via hitch linkage 40. In addition, rod 63 of cylinder 64 is displaced causing cross-link 56 to pivot the support wheel 70 to assume a raised position (shown in Phantom in FIG. 2). In a second position, the control valve 72 causes the cylinder 27 and 29 to raise the lift arms 23 and 25 thereby raising the snow blower 22 via hitch linkage 40. Also, when the control valve 72 occupies the second position, the rod 63 displaces to pivot the cross-link 56 lowering the support wheel in a ground engaging position. It should be noted that in the ground engaging position of the support wheel, the weight of the snow blower 22 is carried by the support wheel, which has a positive effect on vehicle stability and steering traction. It should be further noted that the point of ground engagement of support wheel 68 is slightly leading to the point of ground engagement of the drive wheels 14. The relationship between the points of ground engagement between the drive wheels 14 and support wheel 70 permits the use of a noncastering support wheel 70 which has a cost benefit and which eliminates binding consideration associated with caster wheels.

While the forms of apparatus herein described constitute a preferred embodiment of this invention, it is to be understood that the invention is not limited to this precise form of apparatus, and that changes may be made therein without departing from the scope of the invention which is defined in the appended claims.

What is claimed:

1. A hitch linkage for hitching a ground engaging implement to a vehicle having front drive wheels and rear steering wheels, said vehicle having a plurality of lift arms each pivotally mounted at one end to said vehicle and means for raising and lowering said lift arms, the hitch linkage comprising:

a plurality of hitch arms each operatively connected at one end to said implement and at the other end to a respective one of said lift arms;

a cross-link rotatably mounted between said hitch arms at a position forward of said vehicle between the vehicle and implement;

a pair of support struts operatively connected to said cross-link and having a single support wheel for transferring weight from said front drive wheels to said rear steering wheels rotatably mounted therebetween;

a cylinder pivotally connected at one end to said cross-link at a point remote from the axis of rotation of said cross-link;

and means for pivotally mounting the other end of said cylinder in fixed location relative to said hitch arms whereby said cylinder selectively pivots said cross-link to a first position raising said support wheel or to a second implement carrying position lowering said support wheel to a ground engaging position at a point slightly forward of and in close proximity to said drive wheels point of ground engagement for stabilizing said mower about the axis of said drive wheels.

2. A hitch linkage for hitching an implement to a front mount mower having front drive wheels and rear steering wheels, said front mount mower having a plurality of lift arms pivotally mounted to and extending forwardly therefrom, and means for selectively raising and lowering said lift arms, said hitch linkage comprising:

a plurality of hitch arms each operatively connected at one of its ends to a respective one of said lift arms;

a plurality of hitch plates operatively connected to said implement, the other end of each of said hitch arms being operatively connected to a respective one of said hitch plates;

a cross-link rotatably mounted between said hitch arms at a position forward of said mower between the implement and the mower;

a pair of support struts operatively connected to said cross-link and having a single support wheel rotatably mounted therebetween; and a cylinder means having opposite ends pivotally mounted at one end to said cross-link and pivotally mounted at its other end to one of said hitch plates, for selectively pivoting said cross-link to lower said support wheel into ground engagement whereby said support wheel engages a support surface at a point slightly forward of and in close proximity to a point where said drive wheels engage said support surface such that said support wheel does not substantially interfere with the turning ability of said mower when said support wheel is engaging said support surface.

3. A mechanism for attaching an implement to the front end of a vehicle having front powering wheels and rear steering wheels normally contacting a support surface, at least two pivotably mounted lift arms and means for raising and lowering said lift arms; said mechanism comprising:

means for operatively connecting said implement to said lift arms; and means, including a single support wheel and a cylinder means operatively connected to said implement connection means, for selectively supporting the weight of said implement when said implement is in a raised position such that said rear steering wheels operatively maintain contact with the support surface and said weight support means contacts said support surface slightly forward of the point said powering wheels contact said support surface such that a portion of said implement's weight is transferred to said powering wheels and said support wheel does not materially affect said vehicle's ability to turn.

4. The mechanism of claim 3 wherein said securing means further comprises:

at least two hitch arms each operatively, rigidly secured to said lift arms.

5. The mechanism of claim 4 wherein said selectively supporting means further comprises:

a cross-link rotatably mounted at a position between said hitch arms parallel to said front powering wheels and between said implement and said powering wheels;

at least two support struts rigidly connected to said cross-link; and a support wheel operatively assembled between said support struts and being oriented such that said support wheel contacts said support surface slightly forward of said powering wheels and rotates parallel to said powering wheels thereby providing three-point contact with said support surface.

6. The mechanism of claim 5 wherein said selectively supporting means further comprises:

means, operatively connected to said cross-link and said implement, for raising said support wheel out of contact with said support surface as said implement is lowered by said lift arms into contact with said support surface.

7. The mechanism of claim 6 wherein said support wheel raising means further comprises:
   a control valve having at least two positions;
   means, connecting said vehicle to said support wheel raising means, for displacing a cylinder rod such that said cross-link pivots said support wheel into a raised position and for displacing said cylinder rod such that said cross-link pivots said support wheel into a position engaging said support surface.

8. The mechanism of claim 5 wherein said selectively supporting means further comprises:
   means, operatively connected to said cross-link and said implement, for lowering said support wheel into contact with said support surface as said implement is being raised by said lift arms out of contact with said support surface.

9. The mechanism of claim 5 wherein said selectively supporting means further comprises:
   a hydraulic system having a control valve and at least three hydraulic cylinders.

10. The mechanism of claim 9 wherein said hydraulic system further comprises:
    means, operatively connected to said cross-link and said implement, for selectively raising said support wheel out of contact with said support surface as said implement is lowered by said lift arms into contact with said support surface, and for lowering said support wheel into contact with said support surface as said implement is being raised out of contact with said support surface.

11. A mechanism for attaching an implement to the front end of a vehicle, having front powering wheels, rear steering wheels, at least two pivotally mounted lift arms and means for raising and lowering said lift arms, said mechanism comprising:
    at least two hitch arms each operatively connected to said lift arms;
    a cross-link rotatably mounted at a position between said hitch arms parallel to said front powering wheels and between said implement and said powering wheels;
    at least two support struts operatively connected to said cross-link;
    a single support wheel operatively assembled between said support struts and in a first position contacting a support surface slightly forward and in close proximity to said powering wheels such that the effect of said support wheel upon the turning ability of said vehicle is minimized; and
    means, operatively connected to said cross link and said implement, for allowing said support wheel to move from said first position as said implement is lowered by said lift arms into contact with said support surface.

* * * * *